United States Patent
Overstreet

[11] Patent Number: 5,937,743
[45] Date of Patent: Aug. 17, 1999

[54] COOKING DEVICE FOR TRADITIONAL TACOS

[76] Inventor: Juanita Overstreet, 22301 E. Bundschu Rd., Independence, Mo. 64056

[21] Appl. No.: 09/150,178

[22] Filed: Sep. 10, 1998

[51] Int. Cl.$^6$ ....................................................... A47J 43/18
[52] U.S. Cl. ............................. 99/426; 99/353; 99/394; 99/403; 99/409; 99/421 A; 99/439
[58] Field of Search .......................... 99/349, 353, 394, 99/403, 409, 421 A, 426–442; 30/128; 211/72, 149, 126.16; 294/1.1, 7, 50, 26.5, 99.2, 161, 162; 425/286, 398, 496; D7/601; 426/496, 512

[56] References Cited

U.S. PATENT DOCUMENTS

| | | | |
|---|---|---|---|
| D. 249,219 | 9/1978 | Stence | D7/43 |
| D. 274,494 | 7/1984 | Bonine | D7/43 |
| D. 275,722 | 10/1984 | Bonine | D7/43 |
| D. 289,958 | 5/1987 | Callender | D7/43 |
| D. 326,592 | 6/1992 | Denton | D7/674 |
| 2,570,374 | 10/1951 | Pompa | 99/416 |
| 2,635,528 | 4/1953 | Torres | 99/426 |
| 2,775,929 | 1/1957 | Johnson, et al. | 99/426 |
| 2,957,404 | 10/1960 | Richardson | 99/426 |
| 3,020,826 | 2/1962 | Silva | 99/426 |
| 3,604,342 | 9/1971 | Harding | 99/426 |
| 3,693,537 | 9/1972 | Johnson, et al. | 99/426 |
| 3,745,911 | 7/1973 | Kennedy, Jr. et al. | 99/426 |
| 3,759,165 | 9/1973 | Wallace | 99/439 X |
| 3,817,163 | 6/1974 | Kizziar et al. | 99/353 |
| 3,948,160 | 4/1976 | Stickle | 99/404 |
| 4,154,156 | 5/1979 | Brignall | 99/417 |
| 4,173,926 | 11/1979 | Brignall | 99/349 |
| 4,517,887 | 5/1985 | Childress | 99/426 |
| 4,535,688 | 8/1985 | Bentson | 425/398 X |
| 4,729,589 | 3/1988 | Puskar | 294/26.5 |
| 4,974,502 | 12/1990 | Murdock | 99/426 |
| 5,400,704 | 3/1995 | Huston | 99/450 |
| 5,487,330 | 1/1996 | Mooney | 99/425 |
| 5,628,245 | 5/1997 | Baze | 99/426 |

*Primary Examiner*—Timothy F. Simone
*Attorney, Agent, or Firm*—John D. Gugliotta

[57] ABSTRACT

A cooking device for traditional tacos is disclosed, comprised of a first mold half and second mold half, of identical crescent or arched shaped configuration. The center semi-circular central portion of the first mold half and second mold half is removed. A mold half securement device, such as spring-based clamp, is located at the apex of the present invention, and is used to secure the first mold half and second mold half together during deep frying. In the resting position, the bottom portions of the first mold half and second mold half are in mechanical interference with each other, held in place by the lateral force created by the mold half securement device. The mold half securement device is used to separate the bottom portions of the first mold half and second mold half so as to facilitate the insertion of a traditional taco within. The inside curvature of the first mold half and the second mold half, along with the mold half securement device, is designed and configured such that a taco shell can be filled with meat and placed between the first mold half and second mold half, securing the two mold halves with the mold half securement device, without undue squeezing of the taco so as to rupture the taco shell. As such, the present invention snugly secures a meat filled taco in place during deep frying. A handle portion is used to cook a single traditional taco, while to cook multiple tacos at once, a multi-cooking hole is placed in each mold half securement device, through which a multi-cooking rod is placed.

13 Claims, 6 Drawing Sheets

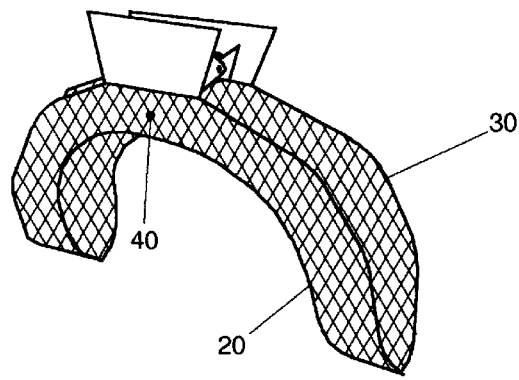
_Figure 3_
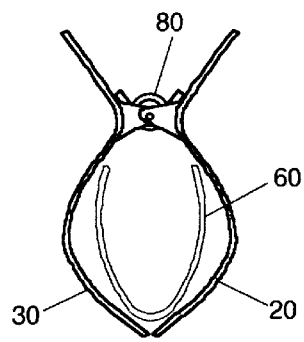
_Figure 4_
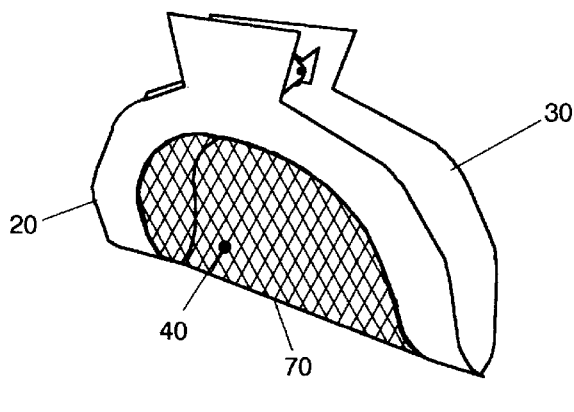
_Figure 5_
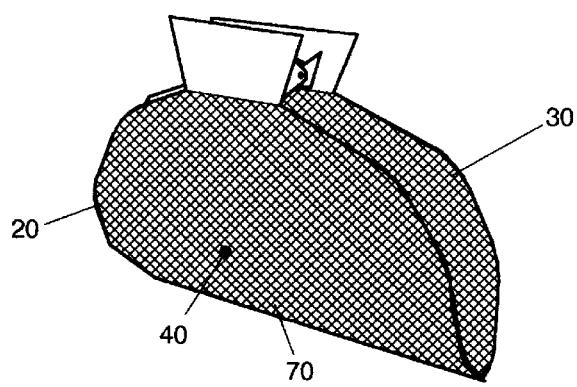
_Figure 6_

COOKING DEVICE FOR TRADITIONAL TACOS

RELATED APPLICATIONS AND DISCLOSURES

The present invention was first disclosed in a Disclosure Document filed on Dec. 23, 1997. There have been no previously filed, nor any co-pending applications anywhere in the world.

BACKGROUND OF THE INVENTION

1. Field of the Invention

The present invention relates generally to cooking devices, and, more particularly, to a cooking device for traditional tacos.

2. Description of the Related Art

Americans, living in the most culturally diverse country in the world, are blessed by having their foods derived from a wide variety of ethnic origins. Among the most popular of these food dishes are those of Mexican cuisine. These dishes offer a multitude of food selections and are available in establishments that range from fast-food to finer dining to preparation in the home.

The most popular of these dishes, as far as Americans are concerned, is the taco. However, authentic preparation of the taco has been lost in its evolution in our society. Conventional tacos, such as those typically served in America today, are prepared by placing the meat inside a precooked circular corn tortilla, folded in an U-shape.

However, the traditional taco tortilla was fried with the taco meat inside the shell. As a result, the taste of the traditional taco has, so to speak, been "lost in the translation." Accordingly, there is a need to provide a means by which Americans can experience the traditional taco taste.

In the related art, several patents disclose handled devices that can be used to cook a single taco shell by immersing the shell in a deep fryer. These include U.S. Pat. No. 4,517,887, issued in the name of Childress, U.S. Pat. No. Des. 249,219, issued in the name of Stence, U.S. Pat. No. Des. 289,958, issued in the name of Callender and U.S. Pat. No. Des. 326,592, issued in the name of Denton.

However, none of these anticipate cooking the shells with the meat inside, nor do they provide a means for containing the meat inside the shell.

Several patents disclose rack-like devices that can be used to cook a plurality of taco shells by frying or baking. However, none of these anticipate cooking the shells with the meat inside, nor do they provide a means for containing the meat inside the shell. These include U.S. Pat. No. 4,974,502, issued in the name of Murdock, U.S. Pat. No. 5,400,704, issued in the name of Huston, U.S. Pat. No. 5,487,330, issued in the name of Mooney, U.S. Pat. No. 5,628,245, issued in the name of Baze, U.S. Pat. No. Des. 274,494, issued in the name of Bonine and U.S. Pat. No. Des. 275,722, issued in the name of Bonine.

Several patents disclose machines that automatically cook a plurality of taco shells by frying. These include U.S. Pat. No. 2,570,374, issued in the name of Pompa and U.S. Pat. No. 3,948,160, issued in the name of Stickle.

However, none of these anticipate cooking the shells with the meat inside, nor do they provide a means for containing the meat inside the shell.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved cooking device for traditional tacos that permits traditional tacos to be prepared by allowing the taco meat to be cooked with the taco.

Briefly described according to one embodiment of the present invention, a cooking device for traditional tacos is disclosed, comprised of a first mold half and second mold half, each of a crescent or arched shaped configuration, spanning an arc of 180 degrees. The first mold half and second mold half are of identical configuration.

The first mold half and the second mold half are constructed of a strong, lightweight material selected from the group comprising metal and ceramic. Each mold half may be of a solid construction.

In an alternate embodiment, the first mold half and second mold half are constructed of a wire mesh configuration, so as to facilitate cooking oil reaching the taco with even heat distribution.

The size of each mold half is slightly larger than that of a folded traditional taco. Both the first mold half and the second mold half have an inside curvature.

The center semi-circular central portion of the first mold half and second mold half is removed.

In an alternate embodiment of the present invention, the central portion of the first mold half and second mold half is covered in a mesh type material, so as to provide increased structural support and integrity to the taco shell placed in the present invention.

In another alternate embodiment, the first mold half and second mold half do not have the semi-circular central portion removed, and both components are of a mesh type configuration.

A mold half securement means, such as spring-based clamp, is located at the apex of the present invention, and is used to secure the first mold half and second mold half together during deep frying. In the resting position, the bottom portions of the first mold half and second mold half are in mechanical interference with each other, held in place by the lateral force created by the mold half securement means. The mold half securement means is used to separate the bottom portions of the first mold half and second mold half so as to facilitate the insertion of a traditional taco within.

The mold half securement means is secured to the apex of the first mold half via rivets or other mold half securement means attachment means.

The inside curvature of the first mold half and the second mold half, along with the mold half securement means, is designed and configured such that a taco shell can be filled with meat and placed between the first mold half and second mold half, securing the two mold halves with the mold half securement means, without undue squeezing of the taco so as to rupture the taco shell. As such, the present invention snugly secures a meat filled taco in place during deep frying.

It is envisioned that a handle portion is releasably secured to the mold half securement means. When connected to the mold half securement means, the handle extends horizontally outward from the present invention, in the same plane as the elongated horizontal centerline of the present invention when the present invention is in the closed position. The handle extends outward a sufficient distance such that the operator is removed from the splash zone created by the present invention in the hot cooking oil.

A heat dissipating material is located on the end of the handle, opposite the mold half securement means.

In another alternate embodiment of the present invention, the handle is replaced with a multi-cooking hole. The multi-cooking hole runs entirely through the mold half securement means. The radial centerline of the multi-cooking hole runs perpendicular to the elongated lateral centerline of the present invention when in the closed position.

It is envisioned that a plurality of the present invention be sold in a kit form, complete with a multi-cooking rod. The multi-cooking rod is of a linearly elongated, cylindrical configuration, of a cross sectional diameter slightly less than that of the multi-cooking hole. The multi-cooking rod is designed to be passed through a plurality of multi-cooking holes on a plurality of the present invention such that a plurality of tacos can be cooked simultaneously in a deep fryer.

It is envisioned that the present invention be used to deep fry other food items, such as deep fried pastries like fruit pie.

It is another object of the present invention to provide a device that prevents the meat from spilling during cooking.

It is another object of the present invention to provide a device that can cook several traditional tacos simultaneously.

It is another object of the present invention to provide a device that is safe to use, reducing the possibility of burns during use.

It is another object of the present invention to provide a device that is durable.

It is another object of the present invention to provide a device that is lightweight.

It is another object of the present invention to provide a device that is easily manufactured using cost effective, well known materials.

DESCRIPTIVE KEY 10 a cooking device for traditional tacos
20 first mold half
30 second mold half
40 wire mesh
50 cooking oil
60 taco
70 central portion
80 mold half securement means
90 apex
95 mold half securement means attachment means
100 handle portion
110 heat dissipating material
120 multi-cooking hole
130 multi-cooking rod
140 deep fryer

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a front perspective view of an alternate embodiment of the present invention;

FIG. 4 is a right side view of the preferred embodiment of the present invention;

FIG. 5 is a front perspective view of another alternate embodiment;

FIG. 6 is a front perspective view of another alternate embodiment;

DESCRIPTION OF THE PREFERRED EMBODIMENTS

In order to describe the complete relationship of the invention, it is essential that some description be given to the manner and practice of functional utility and description of cooking device for traditional tacos 10.

The best mode for carrying out the invention is presented in terms of its preferred embodiment, herein depicted within the FIGS. 1, 2, 4, 7, 8 & 9.

1. Detailed Description of the Figures

Figure 1:
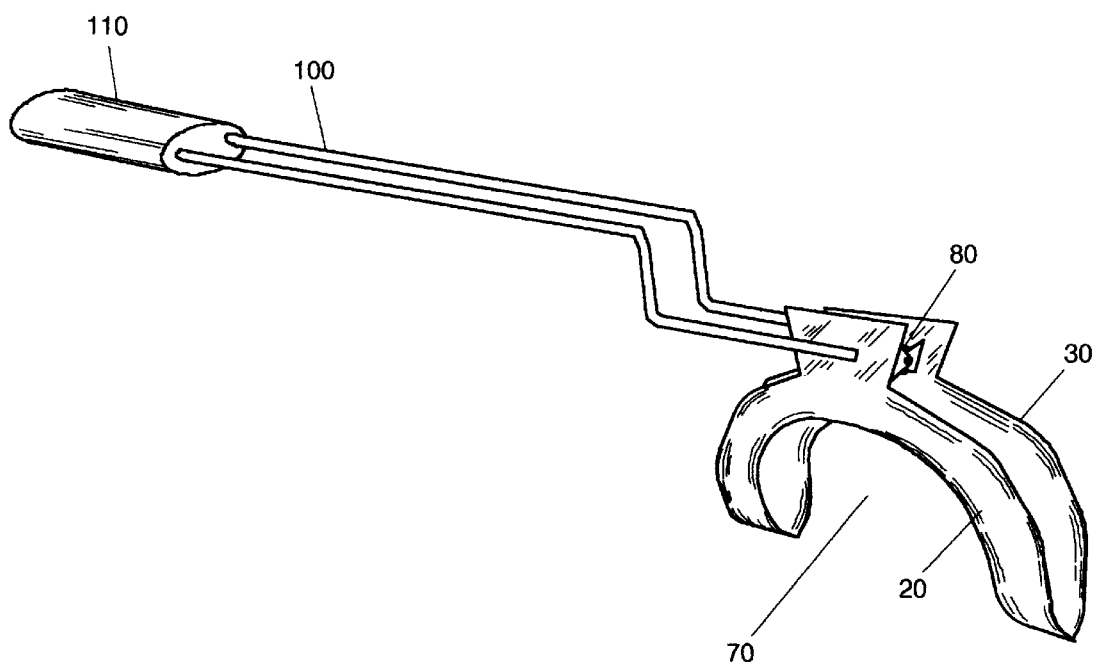
FIG. 1 is a front perspective view of the preferred embodiment of a cooking device for traditional tacos 10.

Referring now to FIG. 1, a cooking device for traditional tacos 10 is shown, according to the present invention, comprises a first mold half 20 and second mold half 30, each of a crescent or arched shaped configuration, spanning an arc of 180 degrees. The first mold half 20 and second mold half 30 are of identical configuration.

Figure 2:
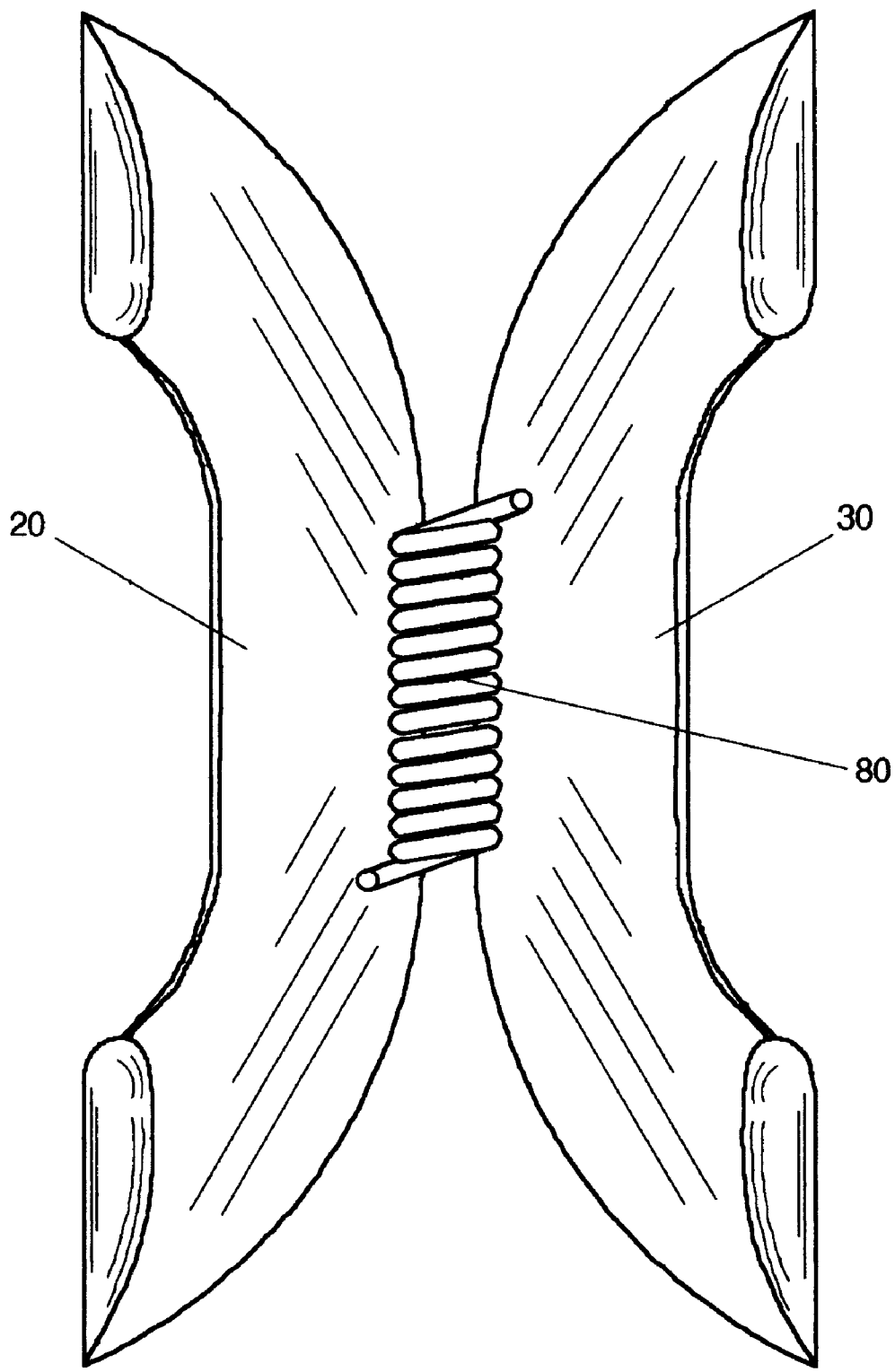
FIG. 2 is a bottom view thereof.

Referring now to FIG. 2, the first mold half 20 and the second mold half 30 are constructed of a strong, lightweight material selected from the group comprising metal and ceramic. Each mold half may be of a solid construction.

Referring now to FIG. 3, in an alternate embodiment, the first mold half 20 and second mold half 30 are constructed of a wire mesh 40 configuration, so as to facilitate cooking oil 50 (not shown) reaching the taco 60 (not shown) with even heat distribution.

Referring now to FIG. 4, the size of each mold half is slightly larger than that of a folded traditional taco 60. Both the first mold half 20 and the second mold half 30 have an inside curvature.

Referring now to FIG. 1, the center semi-circular central portion 70 of the first mold half 20 and second mold half 30 is removed.

Referring now to FIG. 5, in an alternate embodiment of the present invention, the central portion 70 of the first mold half 20 and second mold half 30 is covered in a wire mesh 40 type material, so as to provide increased structural support and integrity to the taco 60 (not shown) shell placed in the present invention.

Referring now to FIG. 6, in another alternate embodiment, the first mold half 20 and second mold half 30 do not have the semi-circular central portion 70 removed, and both components are of a wire mesh 40 type configuration.

Figure 7:
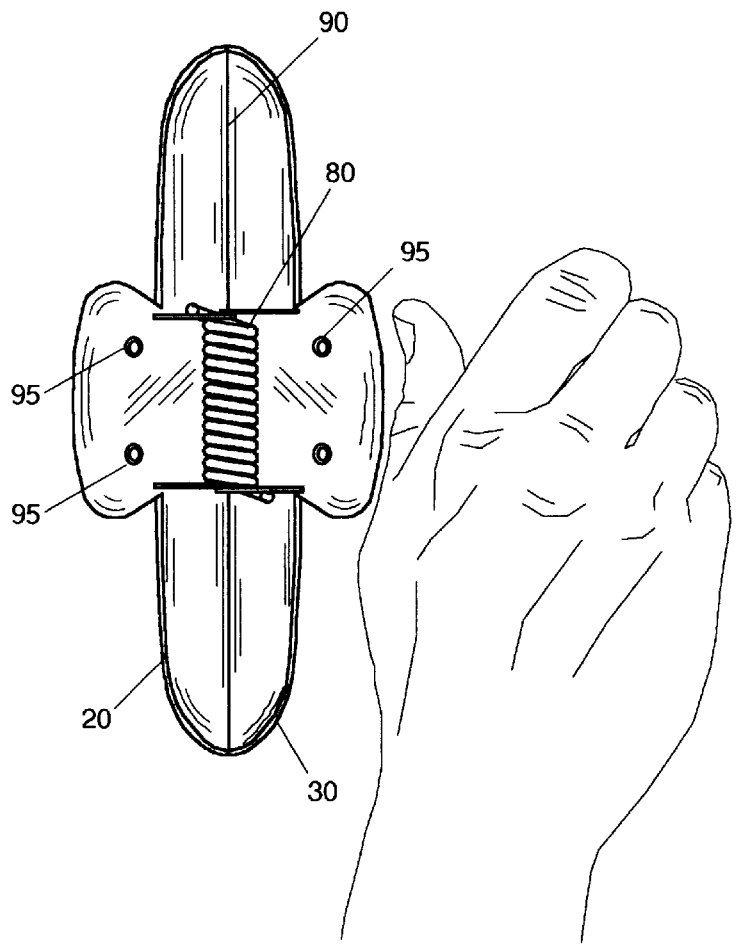
FIG. 7 is a top plan view of the preferred embodiment of the present invention in the closed position.

Referring now to FIGS. 1 & 7, a mold half securement means 80, such as a spring-based clamp, is located at the apex 90 of the present invention, and is used to secure the first mold half 20 and second mold half 30 together during deep frying.

In the resting position, the bottom portions of the first mold half 20 and second mold half 30 are in mechanical interference with each other, held in place by the lateral force created by the mold half securement means 80.

Figure 8:
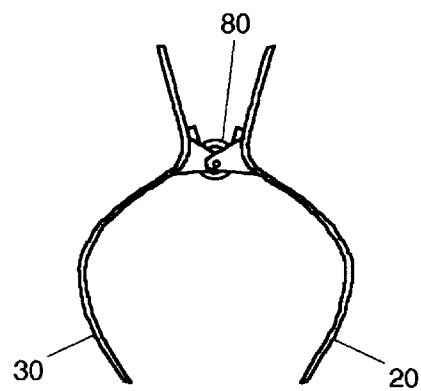
FIG. 8 is a right side view thereof, in the open position.

Referring now to FIG. 8, the mold half securement means 80 is used to separate the bottom portions of the first mold half 20 and second mold half 30 so as to facilitate the insertion of a traditional taco 60 (not shown) within.

Referring now to FIG. 7, the mold half securement means 80 is secured to the apex 90 of the first mold half 20 via rivets or other mold half securement means attachment means 95.

Referring now to FIG. 1, 2 & 4, the inside curvature of the first mold half 20 and the second mold half 30, along with the mold half securement means 80, is designed and configured such that a taco 60 (not shown in FIGS. 1 & 2) shell can be filled with meat and placed between the first mold half 20 and second mold half 30, securing the two mold halves with the mold half securement means 80, without undue squeezing of the taco 60 so as to rupture the taco 60 shell. As such, the present invention snugly secures a meat filled taco 60 in place during deep frying.

Figure 9:
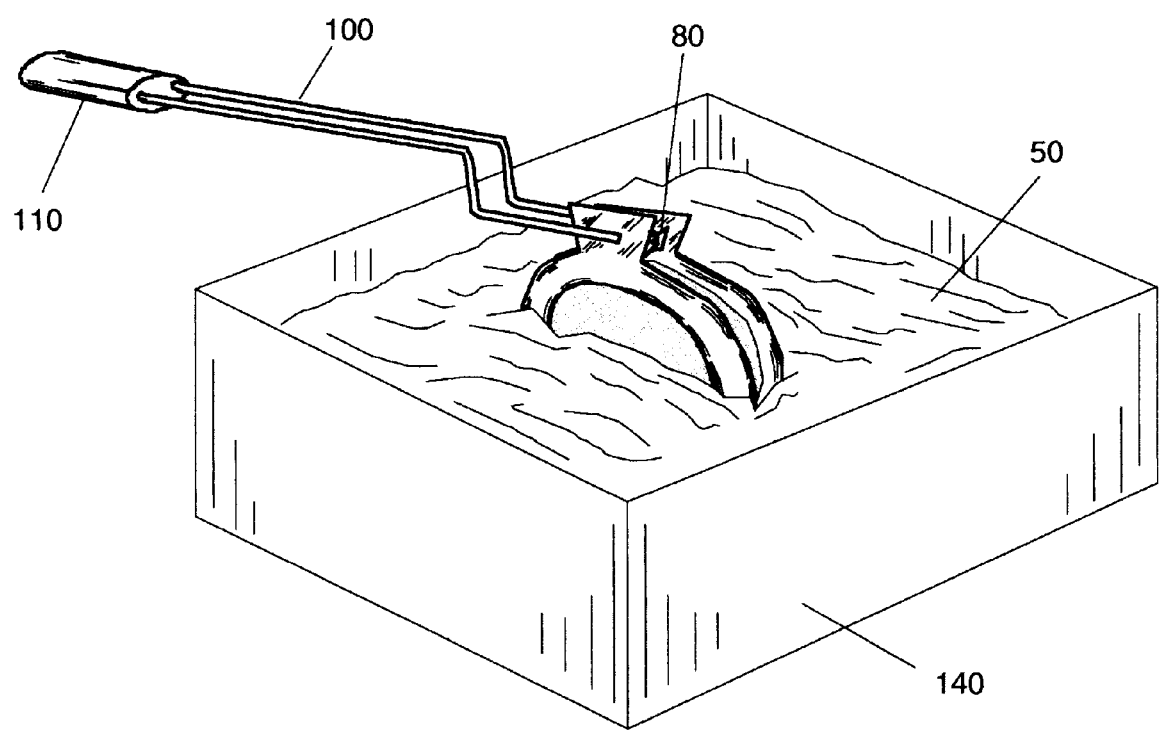
FIG. 9 is an in use view thereof.

Referring now to FIG. 1 & 9, it is envisioned that a handle portion 100 is releasably secured to the mold half securement means 80 via a clamping means, such as a spring loaded clamp. When connected to the mold half securement means 80, the handle portion 100 extends horizontally outward from the present invention, in the same plane as the elongated horizontal centerline of the present invention when the present invention is in the closed position. The handle portion 100 extends outward a sufficient distance such that the operator is removed from the splash zone created by the present invention in the cooking oil 50 (not shown in FIG. 1).

It is envisioned that tongs can also be used with the present invention to maneuver the present invention during cooking.

A heat dissipating material 110 is located on the end of the handle portion 100, opposite the mold half securement means 80.

Figure 10A:
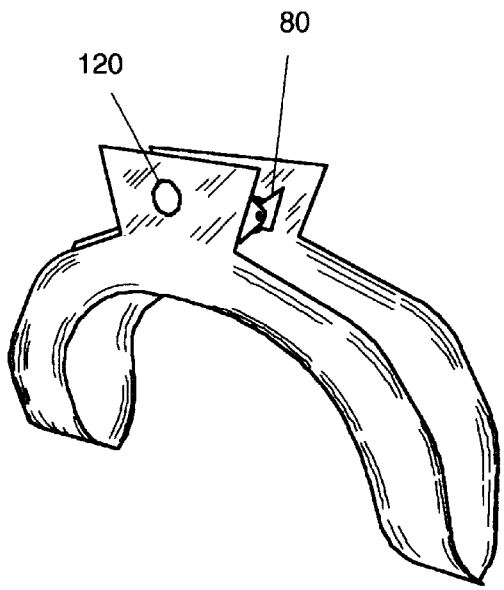
FIG. 10a is a front perspective view of another alternate embodiment of the present invention.

Referring now to FIG. 10*a*, in another alternate embodiment of the present invention, the handle portion 100 is replaced with a multi-cooking hole 120. The multi-cooking hole 120 runs entirely through the mold half securement means 80. The radial centerline of the multi-cooking hole 120 runs perpendicular to the elongated later centerline of the present invention when in the closed position.

Figure 10B:
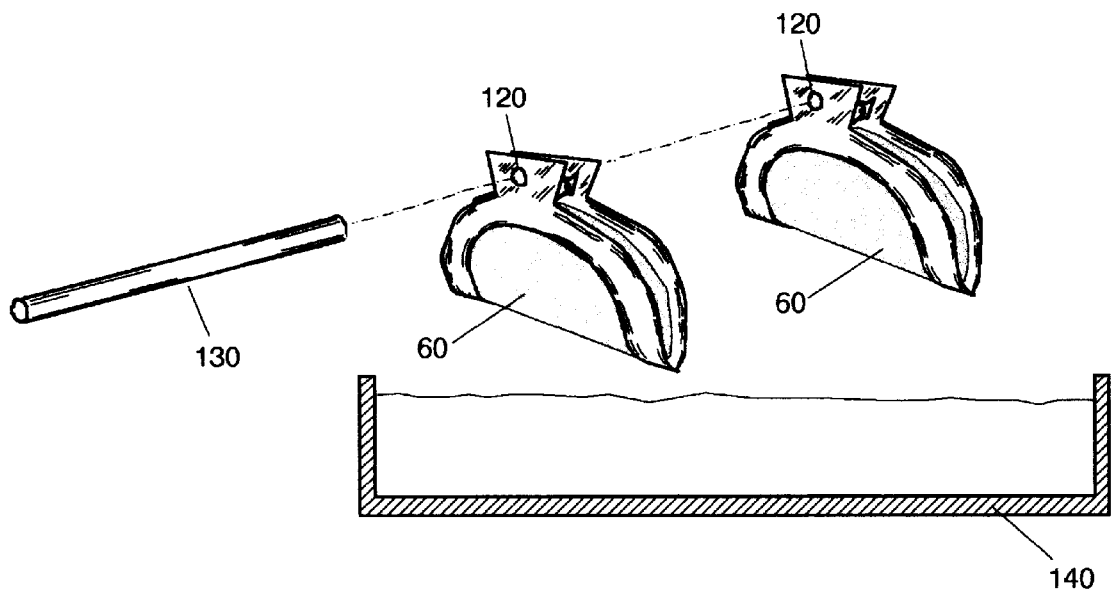
FIG. 10b is an exploded view of a plurality of an alternate embodiment of the present invention in use.

Referring now to FIG. 10*b*, it is envisioned that a plurality of the present invention be sold in a kit form, complete with a multi-cooking rod 130. The multi-cooking rod 130 is of a linearly elongated, cylindrical configuration, of a cross sectional diameter slightly less than that of the multi-cooking hole 120. The multi-cooking rod 130 is designed to be passed through a plurality of multi-cooking holes 120 on a plurality of the present invention such that a plurality of tacos 60 can be cooked simultaneously in a deep fryer 140.

It is envisioned that the present invention be used to deep fry other food items, such as deep fried pastries like fruit pie.

It is envisioned that other styles and configurations of the first mold half 20, second mold half 30, hinging mechanisms, mold half securement means 80, handle portion 100, and multi-cooking rod 130 can be easily incorporated into the teachings of the present invention, and only one particular configuration shall be shown and described for purposes of clarity and disclosure and not by way of limitation of scope.

2. Operation of the Preferred Embodiment

Referring now to FIG. 8, to use the present invention: first pick up a round taco 60 shell, holding it loosely in the center of one's palm and fold the taco 60 shell partially together, resulting in a half moon shape; second, fill the taco 60 with precooked meat, making sure not to overfill the taco 60 shell; third, press the taco 60 shell completely together keeping the meat inside; fourth, pick up the present invention and open up the first mold half 20 and second mold half 30 by pressing the mold half securement means 80 together, resulting in the present invention opening from the bottom; fifth, fit the present invention over the taco 60 shell edges; sixth, release the mold half securement means 80.

Referring now to FIG. 9, seventh, place the present invention in a deep fryer 140, for about thirty seconds, using the detachable handle portion 100; eighth, remove the present invention with the handle portion 100 or tongs; ninth, serve the taco 60 with fresh toppings.

Referring now to FIGS. 10*a* & 10*b*, if the multi-cooking rod 130 (not shown in FIG. 10*a*) is being used, place the multi-cooking rod 130 through the multi-cooking hole 120 on a plurality of the present invention, and grabbing the ends of the multi-cooking rod 130, place the plurality of the present invention in a deep fryer 140.

The foregoing description is included to illustrate the operation of the preferred embodiment and is not meant to limit the scope of the invention. The scope of the invention is to be limited only by the following claims.

What is claimed is:

1. A cooking device for traditional tacos, comprising:
   a first mold half, of a solid, crescent or arched shaped configuration, spanning an arc of 180 degrees, the center semi-circular central portion of said first mold half being removed;
   a second mold half, of a solid, crescent or arched shaped configuration, spanning an arc of 180 degrees, said second mold half and first mold half being of identical configuration, the center semi-circular central portion of said second mold half being removed;
   a mold half securement means, said mold half securement means located at the apex of the present invention, and used to secure said first mold half and second mold half together during deep frying in a hinge like configuration, such that the bottom portions of said first mold half and said second mold half are in releasable tensioned contact with each other;
   mold half securement means attachment means, said mold half securement means attachment means used to secure said mold half securement means to said apex of said first mold half;
   a handle portion, said handle portion having two ends, and said handle portion being releasably secured to said mold half securement means; and
   a heat dissipating material, said heat dissipation material located on the end of said handle, opposite said mold half securement means.

2. The cooking device for traditional tacos described in claim 1, wherein the size of each mold half is slightly larger than that of a folded traditional taco.

3. The cooking device for traditional tacos described in claim 1, wherein both said first mold half and said second mold half have an inside curvature.

4. The cooking device for traditional tacos described in claim 1, wherein the inside curvature of said first mold half and said second mold half, along with said mold half securement means, is designed and configured such that a taco shell can be filled with meat and placed between said first mold half and second mold half, securing said two mold halves with said mold half securement means, without undue squeezing of the taco so as to rupture the taco shell; as such, said cooking device snugly secures a meat filled taco in place during deep frying.

5. The cooking device for traditional tacos described in claim 1, wherein said handle portion is replaced with a multi-cooking hole, said multi-cooking hole running entirely through said mold half securement means.

6. The cooking device for traditional tacos described in claim 5, wherein a plurality of the present invention be sold in a kit form, complete with a multi-cooking rod, said multi-cooking rod having two ends, and of a linearly elongated, cylindrical configuration, of a cross sectional diameter slightly less than that of said multi-cooking hole.

7. The cooking device for traditional tacos described in claim 5, wherein said multi-cooking rod is designed to be passed through a plurality of multi-cooking holes on a plurality of the present invention such that a plurality of tacos can be cooked simultaneously in a deep fryer.

8. The cooking device for traditional tacos described in claim 1, wherein said device can be used to cook any item with a filling that is deep fried.

9. The cooking device for traditional tacos described in claim 1, wherein said first mold half and said second mold half are constructed of a strong, lightweight material selected from the group comprising metal and ceramic.

10. The cooking device for traditional tacos described in claim 1, wherein said first mold half and second mold half are constructed of a wire mesh configuration, so as to facilitate cooking oil reaching said taco with even heat distribution.

11. The cooking device for traditional tacos described in claim 1, wherein the central portion of said first mold half and second mold half is covered in a mesh type material, so as to provide increased structural support and integrity to said taco shell placed within said mesh material between said first mold half and said second mold half.

12. The cooking device for traditional tacos described in claim 1, wherein said first mold half and second mold half do not have the semi-circular central portion removed, and both components are of a mesh type configuration.

13. The cooking device for traditional tacos described in claim 1, wherein in the resting position, said bottom portions of said first mold half and second mold half are in mechanical interference with each other, held in place by the lateral force created by said mold half securement means; said mold half securement means is used to separate said bottom portions of said first mold half and second mold half so as to facilitate the insertion of a traditional taco within.

* * * * *